(No Model.)

L. V. HUE.
ART OF MANUFACTURING ORNAMENTAL GLASSWARE.

No. 355,649. Patented Jan. 4, 1887.

Witnesses:
George H. Potts
G. H. Spencer

Inventor:
L. Victor Hue
By David A. Burr
Attorney

UNITED STATES PATENT OFFICE.

L. V. HUE, OF NEW YORK, N. Y.

ART OF MANUFACTURING ORNAMENTAL GLASSWARE.

SPECIFICATION forming part of Letters Patent No. 355,649, dated January 4, 1887.

Application filed August 15, 1884. Renewed December 7, 1886. Serial No. 220,927. (No model.) Patented in France October 14, 1876, No. 40,640.

*To all whom it may concern:*

Be it known that I, L. VICTOR HUE, a citizen of France, and a resident of the city, county, and State of New York, have invented a new and useful Improvement in the Art of Manufacturing Ornamental Glassware; and I do hereby declare that the following is a full and exact description thereof, reference being had to the accompanying drawings, and to the letters of reference marked thereon, making a part of this specification.

My invention relates to the production of internally ornamented or decorated articles of glass having a smooth finished surface on both sides thereof.

It consists in imprinting, stamping, or molding designs of any desired form or pattern upon the surface of the glass while it is in a soft and plastic condition and subsequently covering the impressed or imprinted surface with a smooth facing or lining of clear glass welded or fused thereon in such manner, as hereinafter described, as not to alter or impair the design or ornamentation first produced, so that said design or ornamental work becomes inclosed within the body of the finished article integrally therewith and entirely ineffaceable.

Figure 1:
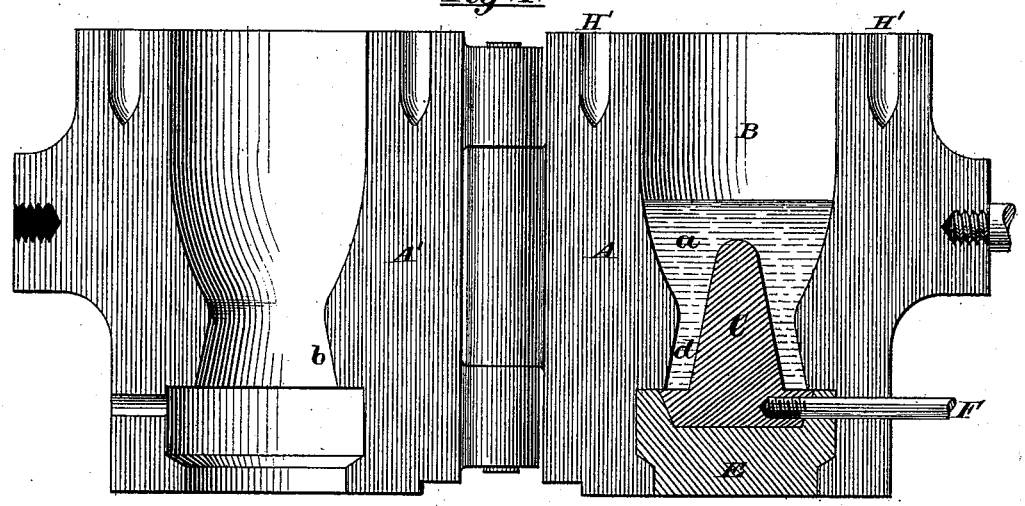
Figure 2:
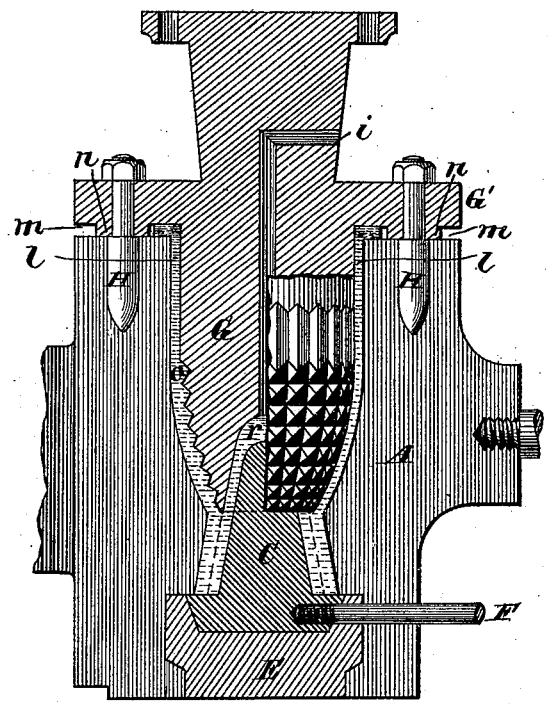

In the accompanying drawings, which illustrate in part one form of the apparatus which I employ in carrying out my invention, Figure 1 illustrates, in elevation, the interior of an open flask or mold. Fig. 2 is a sectional elevation of one-half of the mold with its hollow follower or plunger inserted therein to imprint the glass with the design or ornamentation cut or chased on said plunger, and also produce the internal lining-piece for the glass; and Fig. 3 an elevation, in section, of the molded glass and its lining-piece removed from the mold and in readiness to be blown into the desired finished form.

My invention admits of being reduced to practice in several ways, but that herein described I have found to be the most practical and expeditious.

A charge of molten glass, $a$, is placed in a mold constructed in two sections, A A', hinged together, as illustrated in Fig. 1, to admit of being readily opened. The cavity B in the closed mold is cup-shaped, terminating at the bottom in an outwardly flaring or enlarged recess, within which is fitted a conical block, C, whose sides have an inclination corresponding to that of the recess, but which is so far smaller in diameter as to leave a concentric space, $d$, between the two. This block C is enlarged at its base and supported and upheld by means of a base-block, E, whose periphery is encircled and inclosed by a recess in the bottom of the mold, as illustrated in Figs. 1 and 2. The block C is also fitted with a detachable handle, F, by which it may be lifted from the base E, when required. The charge of glass $a$, when still in a soft, plastic, or semifluid state, is shaped by forcing down within the cavity B of the mold A A' a plunger, G, Fig. 2, whose lower end is recessed to fit over the projecting block C, whose diameter is so far smaller as that a concentric space is left between the two, which is slightly greater at the apex of the block than about its sides. The molten glass is forced into this space so as to completely fill the same, and the surplus of glass is allowed to flow out over the top of the mold through an open space, $m$, Fig. 2, provided for this purpose between the top of the mold and the under side of a flange, G', which encircles the plunger, to overlap the top of the mold. The plunger is guided in entering the mold by means of pins H H, Fig. 2, made to project from the under side of said flange G' into counterpart recesses or sockets H' H', Fig. 1, in the top of the mold, while the depth to which the plunger may enter the mold is limited by means of the offsets $n\ n$, which encircle the base of the pins. These guide-pins H H, with their encircling offsets, insure perfect accuracy and uniformity in the width of the space between the plunger G and the sides of the mold and of the forming-block C, projecting therein, so as to produce invariably a uniform thickness in the glass fashioned thereby.

A vent-passage, $i$, is formed through the plunger G, to extend from the lower end thereof and communicate with the outer air, and through which any air caught within the mold as the plunger descends is allowed freely to escape. The outer face of the plunger G is carved or engraved, or otherwise impressed, either in bas-relief or intaglio, with the design which it is desired to reproduce in the finished glass article; or the design may be applied thereto in gold or silver leaf or filigree-work, or with enamel-powder or pigments, which adhere to the hot plastic glass when brought into contact therewith. When the plunger descends into the fused glass, the inner surface of the latter is forced to accommodate itself to all the configurations and indentations of the plunger, and will receive therefrom the pigments or other matter previously applied thereto. So soon as the molded glass thus forced to assume the form of the space left within the mold by the descent of the plunger therein, and to receive and reproduce the design and devices produced upon the plunger, has hardened sufficiently the plunger is withdrawn and the mold is opened, leaving a hollow cup-shaped glass form supported upon the conical block C, and whose interior face bears the design imparted thereto by the plunger G. The block C is now lifted from the base-block E, and the glass form is reversed by placing its open rim upon a suitable table, T, Fig. 3. The block C is then removed, and the edges of the open end or bottom of the glass form are cut to the proper height. A glass plate upon the end of the blowing-tube K is then cemented by the glass-worker to said open bottom of the form, which is next heated until its outer rim, $l\, l$, (see dotted lines, Fig. 3,) will admit of being closed inward to seal its outer end, as shown in positive lines, Fig. 3, and the entire form is in a condition to be blown into the desired shape. When thus made ready for blowing, air is blown through the tube, and this air will first force the glass in the bulb or conical projection $r$ at the center of the form (see dotted lines, Fig. 3) outwardly in a uniform sheet or film in all directions against the interior indented or embossed or imprinted face of the form, so as to cover the same. The inner film, $r$, thus brought against the outer glass will adhere thereto without impairing the design which it covers, and the entire body of glass, with its adherent covering-film, may then be blown and fashioned into a vase, a glass, a bottle, a knob, and, in fact, any desired shape or form, without impairing the design now embedded therein, and the article when finished will present, with a perfectly smooth inner and outer surface and a singularly-brilliant effect, all the ornamental features of the design.

Figure 3:
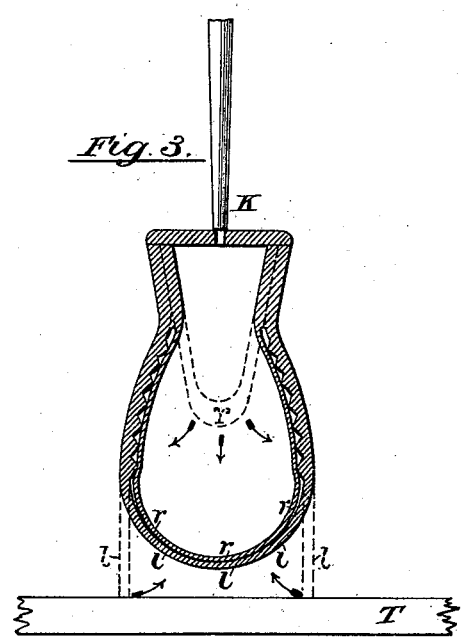

Although I have found it preferable to produce the inner coating-film by first producing a bulb or inward hollow projection, $r$, within the embossed or decorated form in one piece therewith, to be afterward blown out into uniform contact with the embossed or decorated surface, as shown in Fig. 3, I contemplate covering an embossed or decorated surface produced upon a glass form in any suitable manner by blowing against said surface a film or coating of glass, which may be entirely separated therefrom, but which, when blown against the same, is made to adhere thereto by cementation when properly heated, and this may be accomplished with cylinders of glass, to be afterward made into flat plates, as well as into ornamental forms of all descriptions.

I claim as my invention—

1. The process herein described of producing ornamented glassware, which consists in molding glass into a hollow cup-shaped form ornamented upon its inner surface and having an internal projection at its base, and thereafter blowing and spreading the internal projection outwardly in a thin coating or film against the inner ornamented surface of the form, substantially in the manner and for the purpose herein set forth.

2. The combination, with a divided hinged mold, A A', of a detachable conical block, C, fitted to enter the bottom of the mold, close the same, and project centrally therein, and a movable plunger, G, adapted to enter the opposite end of the mold, and whose inner end is recessed to encircle concentrically the inner end of the block C, leaving an open space between them communicating with the space between the plunger and mold, all substantially in the manner and for the purpose herein set forth.

In testimony whereof I have signed my name to this specification in the presence of two subscribing witnesses.

L. V. HUE.

Witnesses:
A. V. BAZERQUE,
E. C. PERKINS.